Dec. 31, 1957     P. C. BOOTY, JR., ET AL     2,818,044
GREASING MACHINE FOR BEARINGS OR THE LIKE

Filed May 2, 1955     2 Sheets-Sheet 1

INVENTORS.
Philip C. Booty, Jr.
Theodore R. Brink
John J. Longdon
Paul O. Pippel
Atty.

Dec. 31, 1957     P. C. BOOTY, JR., ET AL     2,818,044
GREASING MACHINE FOR BEARINGS OR THE LIKE
Filed May 2, 1955     2 Sheets-Sheet 2
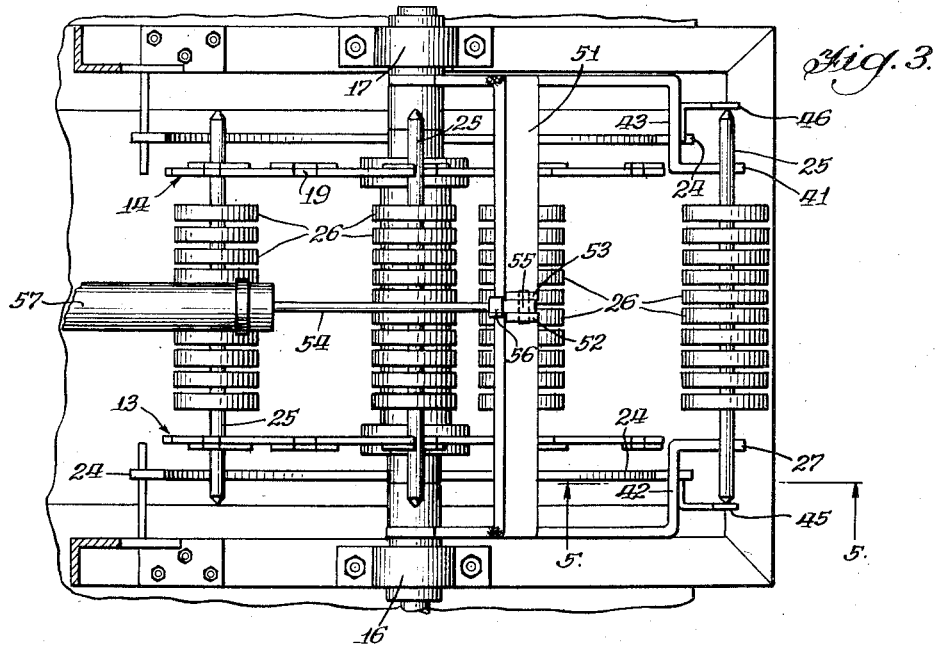
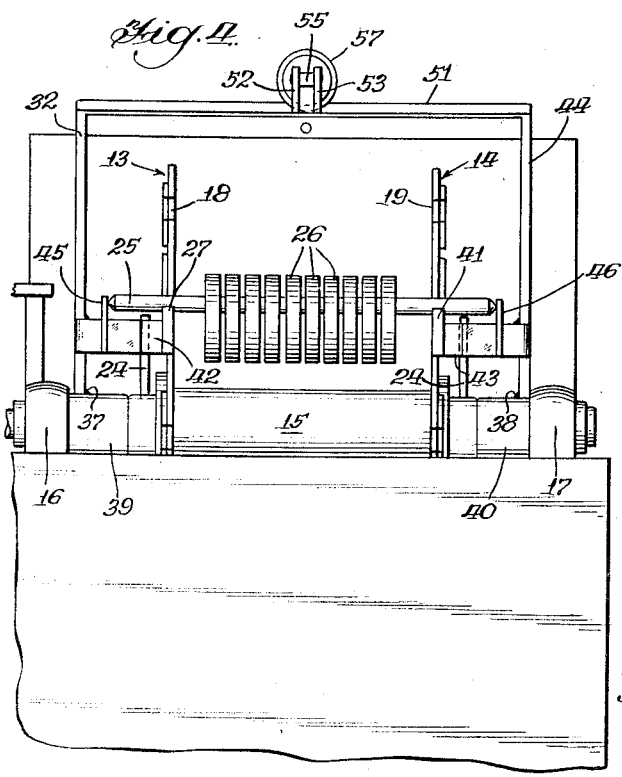
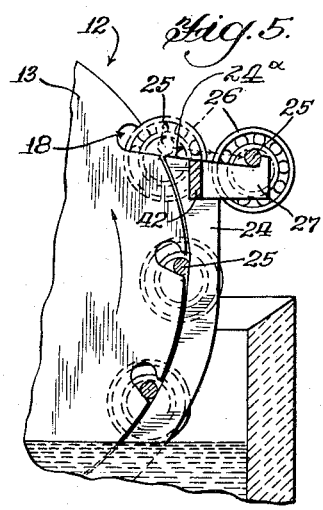
INVENTORS
Philip C. Booty, Jr.
Theodore R. Brink
John T. Longdon
Paul O. Pippel
Atty.

United States Patent Office 2,818,044
Patented Dec. 31, 1957

2,818,044

GREASING MACHINE FOR BEARINGS OR THE LIKE

Philip C. Booty, Jr., Chicago, Ill., Theodore R. Brink, Michigan City, Ind., and John T. Longdon, Chicago, Ill., assignors to International Harvester Company, a corporation of New Jersey Application May 2, 1955, Serial No. 505,094

14 Claims. (Cl. 118—426)

This invention relates to a new and improved greasing machine for bearings or the like.

The cleaning and final greasing or lubricating of bearings following their manufacture is an important adjunct to their manufacture. Both ball and roller bearings must run in a smooth unobstructed path in order to operate most efficiently. Any dirt or foreign substance such as metal scraps or filings would be extremely detrimental to the annular race or track within which the balls or rollers operate. Also, it is known that materials which are unprotected tend to decay and in the case of steel or iron the materials used in the production of bearings, there is a tendency to rust thereby materially damaging the bearings.

It is, therefore, a principal object of this invention to provide a machine for concurrently washing and greasing bearings following their manufacture.

An important object of this invention is the provision of means for washing and greasing a plurality of newly manufactured bearings in a "Ferris" wheel type carrier which causes the submersion of the bearings within a lubricant.

Another important object of this invention is to supply a wheel type carrier for bearing greasing machines in which there is a loading station for bearings and an automatically discharging station for the bearings when they have completed their travel through the lubricant.

A still further important object of this invention is to equip a greasing machine for bearings or the like with a wheel carrier wherein the wheel carrier is mechanically indexed some predetermined distance at regular intervals whereby the bearings are subjected to a lubricant bath in stages, while the wheel carrier progresses through the lubricant.

Other and further important objects and advantages will become apparent from the disclosures in the following specification and accompanying drawings.

In the drawings:

Figure 3 is a top plan view of the device as shown in Figures 1 and 2.

Figure 4 is a front elevational view of the device; and

Figure 5 is a sectional view taken on the line 5—5 of Figure 3.

Figure 1:
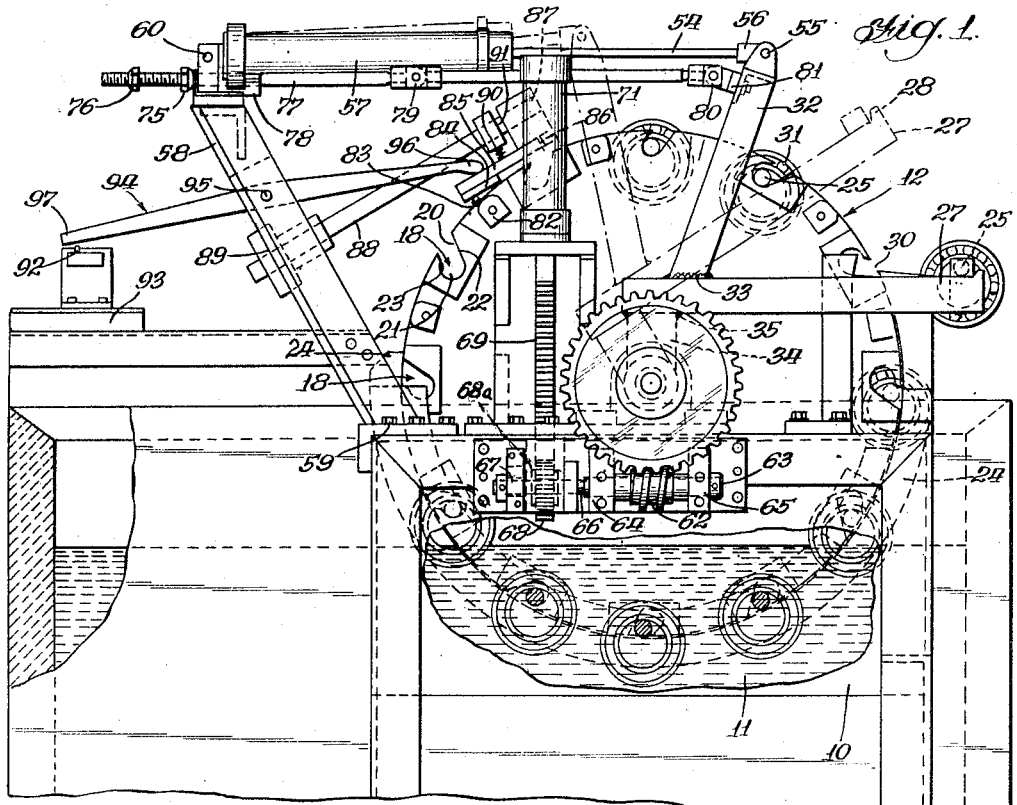
Figure 1 is a side elevational view partially in section of the greasing machine for bearings or the like of this invention.

As shown in the drawing, the reference numeral 10 indicates generally a tank for the purpose of carrying a lubricant grease 11 within which the bearings are washed and lubricant coated. As stated in the objects above, it is the purpose of the lubricant 11 to clean off or wash the newly manufactured bearings and supply a protective coating to the bearing prior to its sale and/or possible storage for some period of time without use. It is imperative that the lubricant used in this job be not agitated unduly for fear of maintaining the dirt and metal filings which may be washed off the bearings in suspension for possible adherence to successive bearings being applied to this machine.

Figure 2:
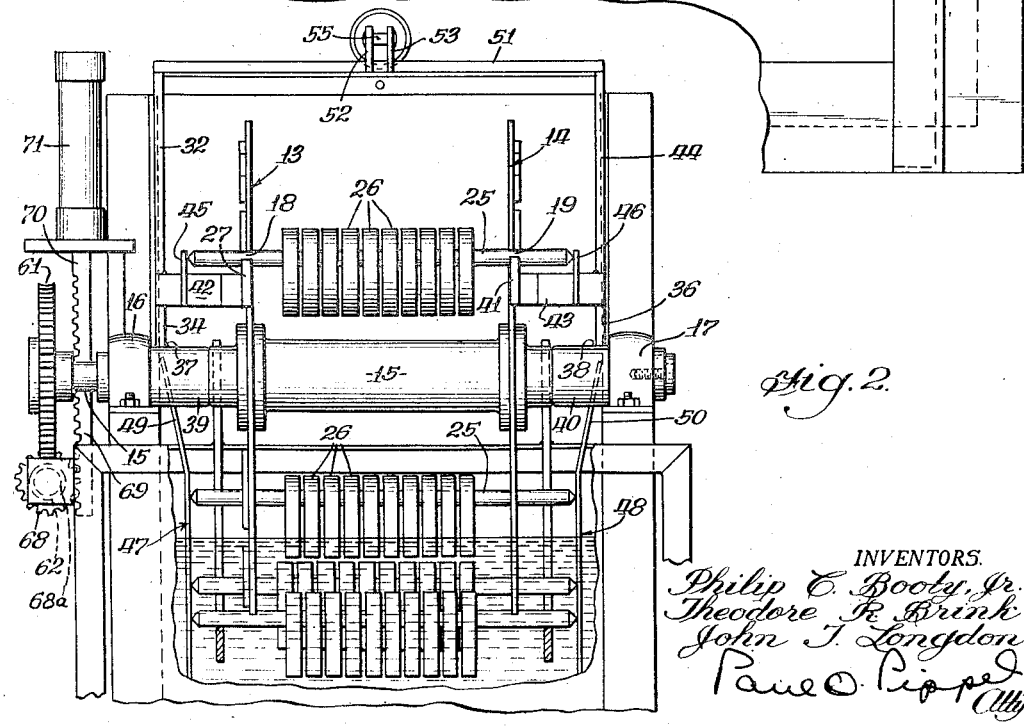
Figure 2 is a partial end or front view of the wheel type bearing carrier as used in the greasing machine of Figure 1.

Above the tank 10 is positioned a wheel type carrier on which the bearings to be greased are placed and carried down and through the lubricant 11. In order to prevent agitation the wheel is moved relatively slowly so there is a minimum of air entrained within the lubricant and a minimum of metal filings or other dirt held in suspension in the liquid lubricant 11. The wheel carrier designated generally as 12 consists of spaced apart disk members 13 and 14, both of which are mounted on a single shaft 15. The shaft 15, as best shown in Figure 2, is carried in spaced apart pillow block bearings 16 and 17 on the top of the lubricant tank 10. Thus, the wheel carrier is journaled for rotation on the top of the tank 10.

As best shown in Figure 2, the wheel carrier disks lie parallel one to the other and are equipped with keyhole type notches 18 and 19 which are in horizontal alignment with each other. The notches 18 and 19 are not exactly the conventional keyhole notch but they do include an outer narrow opening 20 and a relatively large inner part 21. A wall 22 joining the outer narrow opening in the inner large portion is smooth and uninterrupted, whereas the opposite side as shown at 23 has a sharp break from the narrow front or outer portion 20 to the large inner portion 21. The offsets 23 in the slots 18 and 19 are for the purpose of maintaining rods therewithin throughout a considerable portion of the travel of the rods through the lubricant, and similarly the smooth uninterrupted portions 22 of the slots are to facilitate easy removal of the rods from their position within the wheel carrier.

The tank 10 containing the lubricant 11 is provided with fixed spaced apart strap members 24 having a semicircular shape and defining a track or the like for the "Ferris" wheel carrier 12. The arcuate shape of the track members 24 is substantially identical to the outer arcuate shape of the "Ferris" wheel outer disks 13 and 14. The arcuate strap members 24 which are rigidly mounted and form a part of the tank 10 do not actually receive the bearing load of the "Ferris" wheel carrier of this invention but rather the wheel carrier is journally mounted on the shaft 15 which load is taken directly by the pillow block bearings 16 and 17 on the top of the tank 10. Although the "Ferris" wheel carrier does not ride on the semi-circular straps 24, the straps do act to close the outwardly opening notches 18 and 19 in the outer circumferences of the side disk members 13 and 14 at least during that portion of the travel of the "Ferris" wheel through the lubricant tank 10.

The object of this machine is to wash and/or lubricate a plurality of bearing members at one time. An operator employs a rod 25 over which he slides a plurality of ball or roller bearings 26 as best shown in Figure 2. The plurality of bearings are preferably centered between the ends of the rod 25. Thereafter the operator holds the ends of the rod 25 and places the rod with the bearings intermediate the ends thereof on a loading arm 27 which is shown in Figure 1. The dash line position of the arm 27 constitutes the loading station for the machine of this invention and the full line position of the arm 27 constitutes the unloading station of the machine. It should be understood that the length of the rod 25 is sufficient to easily span the space between the carrier side disks 13 and 14 and further that the number of bearings placed on the rod 25 be no greater than the space between the carrier side disks 13 and 14. Immediately upon the operator placing the rod 25 on the loading arm 27 adjacent the shoulder 28 at the outer end thereof the rod 25 will roll down the inclined arm 27 to a point where it enters the aligned keyhole slots 18 at that position of the carrier. The long, smooth walls 22 of the slots 18 and 19 are substantially parallel with the angular inclination of the loading arm 27 thus facilitating ease of entering of the rod 25 into the spaced-apart aligned keyhole slots 18 and 19. The plurality of bearings on the rod 25 are thus carried by the "Ferris" wheel type of carrier through the lubricant bath 11 and thereafter the rod with its bearings thereon are discharged at the unloading station illustrated at 30 in Figure 1. At this point the bearings have been indexed throughout arcuate movements around substantially the full periphery of the "Ferris" wheel path of travel whereupon when the keyhole slots become aligned with the arm 27 in its lowered position just over the tops 24a of the semi-circular straps 24 the rod 25 rolls outwardly by force of gravity from the now downwardly opening keyhole slot to thereupon come to a rest in a position abutting the shoulder 28 on the loading arm 27 whereafter the bearings in any multiple numbers may be packaged for shipment. Generally the keyhole slots from the loading station 31 extending around the portion of the wheel to the lubricant bath 11 are opening upwardly whereby the rods 25 with their loads of bearings 26 will remain in position in the keyhole slots. However, as the "Ferris" wheel turns under and into the lubricant bath 11 the slots turn generally downwardly, and but for the arcuate track members 24 the bearings on the shafts or rods would fall downwardly or away from the "Ferris" wheel carrier 12. It is therefore the function of the arcuate members 24 to maintain the bearings being washed in association with the Ferris wheel carrier 12 until such time as the bearings with their rods arrive at the discharge or unloading station 30 of the device whereupon the rods are permitted to roll outwardly of the keyhole slots 18 and 19 and down the loading arms 27 in their lowermost position whereupon the washed and greased bearings are reposing at the end of the arm in a position adjacent the outer shoulder stop 28. Thereafter the operator may lift the bearings by means of the rod 25 from the machine and wrap them by pulling the rod outwardly of the multiple number of bearings leaving the bearings in side by side relationship and facilitating wrapping in waterproof paper or boxes or the like.

The loading arm 27 is a part of a fabricated structure which also has an upwardly and somewhat outwardly extending arm 32 which is welded as at 33 to the arm 27. A downwardly extending arm 34 is welded at 35 to the underside of the loading arm 27. As best shown in Figure 2 the leg 34 is duplicated on each side of the machine and therefore the leg on the other side of the machine is indicated by the numeral 36. Both downwardly depending legs 34 and 36 are weldably attached at 37 and 38 to sleeve members 39 and 40 which are journally mounted on the cross shaft 15 which as previously described carries the "Ferris" wheel type of carrier 12. The material-receiving ends of the loading arms 27 are spaced inwardly from the downwardly depending arms 34 and 36 as shown in Figure 2 to thus facilitate ease of loading or unloading of the machine of this invention.

In order that the device be fully identified, a reference numeral 41 is being placed on the combination bearing, loading and discharging arm located on the far side of the machine and corresponding to the combination arm 27 in the side of the machine visible in Figure 1. The arm 41 is parallel to the arm 27 and is associated with the depending arm 36 forming a unitary structure with the sleeve bearing 40, whereas the arm 27 is joined with the depending arm 34 and is fastened to the sleeve bearing 39 by the weld 37. These units which provide for the insertion and removal of bearings to be washed and greased in this machine also include transversely extending frame members 42 and 43. The unit 42 includes the combination bearing receiving and discharge arm 27 and the downwardly depending arm 34. Also, that unit includes the upwardly extending arm 32 which receives the drive for moving the receiving arm 27 from a bearing discharge position to a bearing loading position. Similarly on the other side of the machine an upwardly extending arm 44 corresponds to the arm 32 and combines with the elements 41, 43 and 36 to form an integral unit. Further, the spaced apart units have guide members 45 and 46 on the transverse portions 42 and 43. These side members guide the ends of the bearing holding rods 25 and thus insure that the bearings remain on the rod and in the "Ferris" wheel carrier. It should be understood that these guide members 45 and 46 provide centering means for the operator when he inserts the bearings and their rod into the carrier device. When the bearings are driven through the washing and greasing lubricant they are guided throughout their full path of travel by spaced apart guide members 47 and 48. The upper ends of the guides 47 and 48 are flared outwardly, as shown at 49 and 50, to facilitate the rods 25 entering between the guides. If any of the rods 25 should become slightly off center during its travel around the top of the "Ferris" wheel carrier, the flared mouth defined by the elements 49 and 50 will cause the rods to be centered and the guide members 47 and 48 will hold the centering of the rods throughout the passage of the bearings through the washing and greasing lubricant. The combination loading and unloading arms 27 and 41 are spaced outwardly or forwardly of the "Ferris" wheel so that the relatively long bearing carrying rods 25 can pass between the widely spaced arms 32 and 44 of the arm structure and thence roll outwardly onto the narrowly spaced apart arms 27 and 41. This offset in the arm structure is particularly shown in Figures 2, 3 and 4. Figure 5 shows the top 24a of the track 24 and the arm 27 in alignment at station 30 to remove the bearing from the "Ferris" wheel washing drum.

The upper ends of the spaced apart arms 32 and 44 of the side loading and discharging elements are joined by a cross member 51, as best shown in Figure 2. The cross member provides the attaching means with the driving mechanism for causing the advancing of the discharging station to the position of loading station. An upwardly extending clevis composed of side members 52 and 53 form the means for attaching the forward end of a piston rod 54. A cross pin 55 is adapted to receive the collar 56 at the end of the piston rod 54. A hydraulic cylinder 57 is carried on a supporting frame member 58 which in turn is mounted on the tank frame structure 10 at 59. The mounting of the cylinder 57 on the frame member 58 is by means of a hinge 60 at the rearward end of the cylinder. Thus the forward end of the cylinder and including the piston rod 54 may swing arcuately about the hinge 60, as shown in the dashed line position of the cylinder in Figure 1. The full line position of the arms 32 and 44 correspond to the position of the piston, not shown, within the cylinder 57 being at the fully extended position, whereas the dashed line position of the arms 32 and 44 indicate the withdrawal of the piston rod 54 and thus also the piston, not shown, within the cylinder 57. The movement of the piston rod 54 is accomplished by admitting fluid under pressure to either end of the cylinder 57. If the fluid under pressure is admitted to the end of the cylinder adjacent the hinge 60, then the piston rod 54 will be extended as in Figure 1, resulting in a positioning of the mechanism corresponding to the discharging station for the unloading of bearing units. However, when fluid under pressure is admitted to the end of the cylinder away from the hinge 60, then the piston rod 54 is withdrawn, pulling upwardly on the arms 32 and 44, causing the integral units to rock about the bearing sleeves 39 and 40 whereupon the loading and unloading arms 27 and 41 are in the position as shown in dashed lines in Figure 1 which is the loading station for the bearings to be washed and greased.

The next step in the operation of the machine of this invention relates to the indexing of the "Ferris" type carrier wheel wherein the bearings to be washed and greased are carried and pass through the washing and greasing lubricant. In order that the carrier facilitate loading and unloading, the carrier wheel is indexed at regular intervals throughout a predetermined distance. A large worm gear 61 is mounted on the shaft 15 which carries the "Ferris" wheel type of carrier. The worm gear is located outside of the lubricant tank 10 and is in engagement with a worm member 62. The worm member is mounted on a cross shaft 63 which is journaled in bearing members 64 and 65. An extension 66 of the shaft 63 is journaled at its outer end at 67. A spur pinion gear 68 is carried over the extension 66 of the shaft and is in operative engagement with a vertically disposed gear rack 69. The pinion 68 is mounted on a free wheel clutch 68a so that shaft 66 will rotate only on downward stroke of rack 69. The gear rack 69 constitutes an extension of a piston rod 70 projecting downwardly from a fluid operated cylinder 71. It should be apparent as the piston rod 70 and its integral rack 69 are extended downwardly the spur gear 68 will be caused to rotate thus imparting corresponding rotation to the worm 62 and the large worm gear 61. Thereupon the carrier 12 which is mounted on the shaft 15 rotates an amount commensurate with the amount of movement of the gear rack 69. Here again the admission of fluid under pressure to either the upper or lower ends of the cylinder 71 will cause the movement of the gear rack 69. But, as previously stated, this movement is transmitted to the wheel carrier 12 only on the downward stroke of the gear rack 69. The operation of the hydraulic cylinder 57 to control the position of the bearings, removal rack and mounting rack is accomplished by electrical means, not shown. However, the mechanical means for actuating the electrical switches and circuits are shown at 75 and 76. These mechanical stop members are fastened to an elongated rod member 77 which is journalled through a portion 78 of the frame member 58 and by means of the universal joint 79 and a second universal joint 80 the rod is fastened at 81 to the upwardly extending arm 32 which controls the position of the bearing removal and feed rack.

The means for operating the cylinder 71 and thus the means for indexing the rotary turntable 12 is accomplished by electrical means (not shown) and here again the mechanical means for actuating the electrical switches and circuits are shown in their environment with the bearing, washing and greasing machine of this invention. The device is manually started by the operator closing the electrical circuit. Means is provided for alternately delivering fluid to the top and then the bottom of the cylinder 71 which comprises the prime mover of this apparatus. Thus the wheel continues to advance in small increments until it is interrupted by a superimposed circuit interrupter. A plurality of cams or projection members 82 are provided adjacent each of the receiving sockets on the "Ferris" type carrier wheel of this invention. As shown in Figure 1 the projection 82 is in engagement with a small roller 83 depending from a block member 84 on an arm 85. The arm 85 is hinged at 86 on a carrier member 87. The carrier member 87 is in turn mounted on a fixed arm 88 supported at 89 on the frame member 58. A spring 90 is arranged to abut against a supporting block member 91 on the arm 88 and urges downwardly against the hinged arm 85. Thus this normally maintains the depending roller 83 downwardly for engagement with the projections or cams 82 as they come up on the periphery of the carrier wheel 12. A micro-switch 92 is mounted on a supporting member 93 forming a part of the tank frame 10 of this invention. An arm 94 is pivotally mounted at 95 on the frame member 58 and is permitted rocking movement thereabout. One end 96 of the pivoting arm 94 is in engagement with the top side of the hinged arm 85 and thus movements of the arm 85 are transmitted to the arm 94. The other end 97 of the arm 94 is in proximity to the micro-switch 92 and when the end 96 of the pivotal arm 94 is urged upwardly the micro-switch 92 is actuated to in turn interrupt the electrical circuit which was previously manually closed. The device is so arranged that the wheel remains idle until the circuit is again manually closed whereupon the wheel is rotated until it reaches the next station where it is halted by actuation of the interrupter switch 92.

In the operation of the device of this invention the operator stands in front of the machine or at the right hand side as viewed in Figure 1. The operator thereupon takes a plurality of ball or roller bearings and places them on a rod 25. These bearings with their rods are deposited on the receiving arms 27 and 41 in their dash line position as shown in Figure 1 whereupon the rod 25 goes downwardly to be received into the sockets 18 and 19 in the spaced disks 13 and 14 of the carrier 12. The keyhole slots then are capable of carrying the bearings with their rod around the entire circumference of the "Ferris" wheel whereupon they receive the lubricant washing and greasing as they pass through the lubricant bath 11 within the tank 10. The carrier 12 is indexed one station at a time. The stations are defined as the arcuate distance between the adjacent notches 18 and 19 in the parallel disks. Movement is relatively slow to avoid creating agitation of the lubricant 11 thereupon permitting metal filings or dirt on the bearings to be dropped downwardly to the bottom of the tank without fear that agitation will bring the dirt up for contact with succeeding bearings to be washed. When the bearings go down within the lubricant portion of the tank 10 they are held in the carrier notches by means of the arcuate frame members 24. The rods 25 are held and positioned between the guide members 47 and 48. After the bath in the lubricant 11 is completed the bearings arrive at the station 30 as shown in Figure 1 whereupon the notches 18 and 19 are uncovered and the rod 25 is permitted to roll outwardly on the arms 27 and 41 to the receiving station whereupon the operator may remove the bearings 26.

Various details of construction may be varied throughout a wide range without departing from the principles disclosed herein, and we, therefore, do not propose limiting the patent granted hereon otherwise than as necessitated by the appended claims.

What is claimed is:

1. A greasing machine for articles comprising a supporting structure, a lubricant tank on said supporting structure, a "Ferris" wheel type article carrier journaled for rotation on said supporting structure, said carrier having a substantial portion thereof depending within said lubricant tank and the remainder thereof projecting out of said lubricant tank, means on said carrier for holding articles to be greased, and arm means hingedly mounted on said supporting structure, said arm means in one position thereof inclined inwardly and downwardly constituting a loading station for articles to be greased to deliver articles to said means on the carrier for holding the articles and another position thereof inclined outwardly and downwardly constituting an unloading station for articles already greased.

2. A device as set forth in claim 1 in which there is included means moving said arm means from one position to the other to successively act as loading and unloading stations for said greasing machine.

3. A device as set forth in claim 1 in which there is included means for rotatably moving said carrier in increments about its journal support.

4. A device as set forth in claim 3 in which said means for rotatably moving said carrier includes a worm gear associated with said carrier, a worm engaging said worm gear, and fluid cylinder means for imparting drive to said worm.

5. A device as set forth in claim 1 in which the means on said carrier for holding articles includes said carrier having keyhole shaped notches opening to the outer periphery thereof.

6. A device as set forth in claim 5 in which arcuate guide means is provided on said supporting structure for close engagement with said carrier throughout the lubricant tank depending portion.

7. A device as set forth in claim 1 in which the carrier includes spaced apart discs.

8. A device as set forth in claim 7 in which the means on said carrier for holding articles includes said spaced carrier discs having transversely aligned keyhole shaped notches opening to the outer peripheries thereof.

9. A device as set forth in claim 8 in which the keyhole shaped notches are evenly spaced at regular intervals around the peripheries of the spaced apart discs.

10. A device as set forth in claim 9 in which arcuate guide means are provided adjacent the portions of the circumferences of the discs which depend within the lubricant tank.

11. A device as set forth in claim 10 in which said arm means includes spaced members adjacent each of said carrier discs.

12. A device as set forth in claim 11 in which the spaced members of the arm means project outwardly beyond the circumference of the carrier discs, and shoulder means at the outer ends of each of said spaced members whereby rods having articles to be greased may be placed across said spaced members and thereupon be delivered to one set of aligned keyhole shaped notches.

13. A device as set forth in claim 12 in which the spaced positions of the arm means coincide with the spacing between adjacent sets of aligned keyhole shaped notches.

14. A device as set forth in claim 12 in which guide means are mounted on said supporting structure to maintain said article carrying rods centered on said carrier.

References Cited in the file of this patent

FOREIGN PATENTS 310,270     Great Britain  ---------- Apr. 25, 1929